United States Patent
You et al.

(10) Patent No.: US 10,848,266 B2
(45) Date of Patent: Nov. 24, 2020

(54) DATA RECEPTION METHOD AND DEVICE, AND DATA TRANSMISSION METHOD AND DEVICE

(71) Applicant: LG Electronics Inc., Seoul (KR)

(72) Inventors: Hyangsun You, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/314,524

(22) PCT Filed: Jul. 3, 2017

(86) PCT No.: PCT/KR2017/007041
§ 371 (c)(1),
(2) Date: Dec. 31, 2018

(87) PCT Pub. No.: WO2018/004320
PCT Pub. Date: Jan. 4, 2018

(65) Prior Publication Data
US 2019/0165882 A1 May 30, 2019

Related U.S. Application Data

(60) Provisional application No. 62/401,933, filed on Sep. 30, 2016, provisional application No. 62/373,986, (Continued)

(51) Int. Cl.
*H04J 3/18* (2006.01)
*H04L 1/00* (2006.01)
(Continued)

(52) U.S. Cl.
CPC .......... *H04L 1/0013* (2013.01); *H04L 1/0065* (2013.01); *H04L 1/1819* (2013.01);
(Continued)

(58) Field of Classification Search
CPC ... H04L 1/0009; H04L 1/0013; H04L 1/0031; H04L 1/0041; H04L 1/0045;
(Continued)

(56) References Cited

U.S. PATENT DOCUMENTS 10,524,244 B2 * 12/2019 Tsai .................... H04W 72/042
2004/0237016 A1 11/2004 Sudo
(Continued)

FOREIGN PATENT DOCUMENTS

JP 2015149786 8/2015
KR 1020100026983 3/2010

OTHER PUBLICATIONS

Guangdong Oppo Mobile Telecom, eMBB data transmission to support dynamic resource sharing between eMBB and URLLC, 3GPP TSG RAN WG1 Meeting #87, 4 pages, Nov. 2016.*
(Continued)

*Primary Examiner* — Frank Duong
(74) *Attorney, Agent, or Firm* — Fish & Richardson P.C.

(57) ABSTRACT

The transmission device may transmit a plurality of code blocks corresponding to data. The transmission device may provide, to a reception device, puncturing information indicating whether the plurality of code blocks include a punctured code block. The reception device may reconstruct data from the received code blocks on the basis of the puncturing information.

16 Claims, 12 Drawing Sheets

Related U.S. Application Data filed on Aug. 12, 2016, provisional application No. 62/357,385, filed on Jul. 1, 2016.

(51) Int. Cl.
*H04L 1/18* (2006.01)
*H04W 72/04* (2009.01)
*H04L 5/00* (2006.01)

(52) U.S. Cl.
CPC ..... *H04W 72/042* (2013.01); *H04W 72/0446* (2013.01); *H04W 72/0453* (2013.01); *H04L 1/0031* (2013.01); *H04L 1/0061* (2013.01); *H04L 1/0063* (2013.01); *H04L 5/0007* (2013.01)

(58) Field of Classification Search
CPC ... H04L 1/0061; H04L 1/0063; H04L 1/0065; H04L 1/0066; H04L 1/1819; H04L 1/1822; H04L 1/1854; H04L 1/1896; H04L 5/0007; H03M 13/2909; H03M 13/2966; H04W 72/04; H04W 72/042; H04W 72/0446; H04W 72/0453
See application file for complete search history.

(56) References Cited

U.S. PATENT DOCUMENTS

| | | |
|---|---|---|
| 2016/0128056 A1 | 5/2016 | Jiang et al. |
| 2016/0173232 A1 | 6/2016 | Mallik et al. |
| 2017/0285130 A1* | 10/2017 | Kim .......................... H04L 1/00 |
| 2019/0165906 A1* | 5/2019 | Bala ......................... H04J 11/00 |
| 2019/0190645 A1* | 6/2019 | Sano ...................... H04L 1/0069 |

OTHER PUBLICATIONS

LG Electronics, On multiplexing between eMBB and URLLC, 3GPP TSG RAN WG1 Meeting #86bis, 12 pages, Oct. 2016.*
PCT International Search Report and Written Opinion in International Appln. No. PCT/KR2017/007041, dated Oct. 26, 2017, 25 pages (with English translation).

* cited by examiner (a)          (b)

DATA RECEPTION METHOD AND DEVICE, AND DATA TRANSMISSION METHOD AND DEVICE

CROSS-REFERENCE TO RELATED APPLICATIONS

This application is a National Stage application under 35 U.S.C. § 371 of International Application No. PCT/KR2017/007041, filed on Jul. 3, 2017, which claims the benefit of U.S. Provisional Application No. 62/401,933, filed on Sep. 30, 2016, U.S. Provisional Application No. 62/373,986, filed on Aug. 12, 2016, and U.S. Provisional Application No. 62/357,385, filed on Jul. 1, 2016. The disclosures of the prior applications are incorporated by reference in their entirety.

TECHNICAL FIELD

The present invention relates to a wireless communication system, and more particularly, to methods and devices for transmitting/receiving data.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

Disclosure

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies (NR).

Also, a channel coding scheme and/or data mapping scheme suitable for NR system is required.

The technical objects that can be achieved through the present invention are not limited to what has been particularly described hereinabove and other technical objects not described herein will be more clearly understood by persons skilled in the art from the following detailed description.

Technical Solution

A transmitting device may transmit a plurality of code blocks corresponding to data. The transmitting device may provide a receiving device with puncturing information on whether the plurality of code blocks include punctured code blocks. The receiving device may recover data from the received code blocks based on the puncturing information.

In one aspect of the present invention, provided herein is a method for receiving data by a receiving device is provided. The method comprises: receiving a plurality of code blocks corresponding to the data; and receiving puncturing information indicating whether the plurality of code blocks include punctured code blocks.

In another aspect of the present invention, provided herein is a receiving device for receiving data is provided. The receiving device comprises a radio frequency (RF) unit; and a processor configured to control the RF unit. The processor is configured to: control the RF unit to receive a plurality of code blocks corresponding to the data and receive puncturing information indicating whether the plurality of code blocks include punctured code blocks.

In still another aspect of the present invention, provided herein is a method for transmitting data by a transmitting device is provided. The transmitting method comprises: transmitting a plurality of code blocks obtained from the data; and receiving puncturing information indicating whether the plurality of code blocks include punctured code blocks.

In further still another aspect of the present invention, provided herein is a transmitting device for transmitting data is provided. The transmitting device comprises a radio frequency (RF) unit; and a processor configured to control the RF unit. The processor is configured to: control the RF unit to transmit a plurality of code blocks obtained from the data and transmit puncturing information indicating whether the plurality of code blocks include punctured code blocks.

In each aspect of the present invention, the receiving device may receive retransmission of the data. Retransmission of the punctured code blocks of the plurality of code blocks may be received based on a first redundancy version value, and retransmission of non-punctured code blocks may be received using a second redundancy version value.

In each aspect of the present invention, the receiving device may receive first control information indicating retransmission of the punctured code blocks and second control information indicating retransmission of the non-punctured code blocks. The first control information may include information on the first redundancy version value, and the second control information may include information on the second redundancy version value.

In each aspect of the present invention, the first redundancy version value may be equal to a redundancy version value used for initial transmission of the data.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the NR system.

According to the channel coding scheme and/or data mapping scheme of the present invention, throughput of the NR system may be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
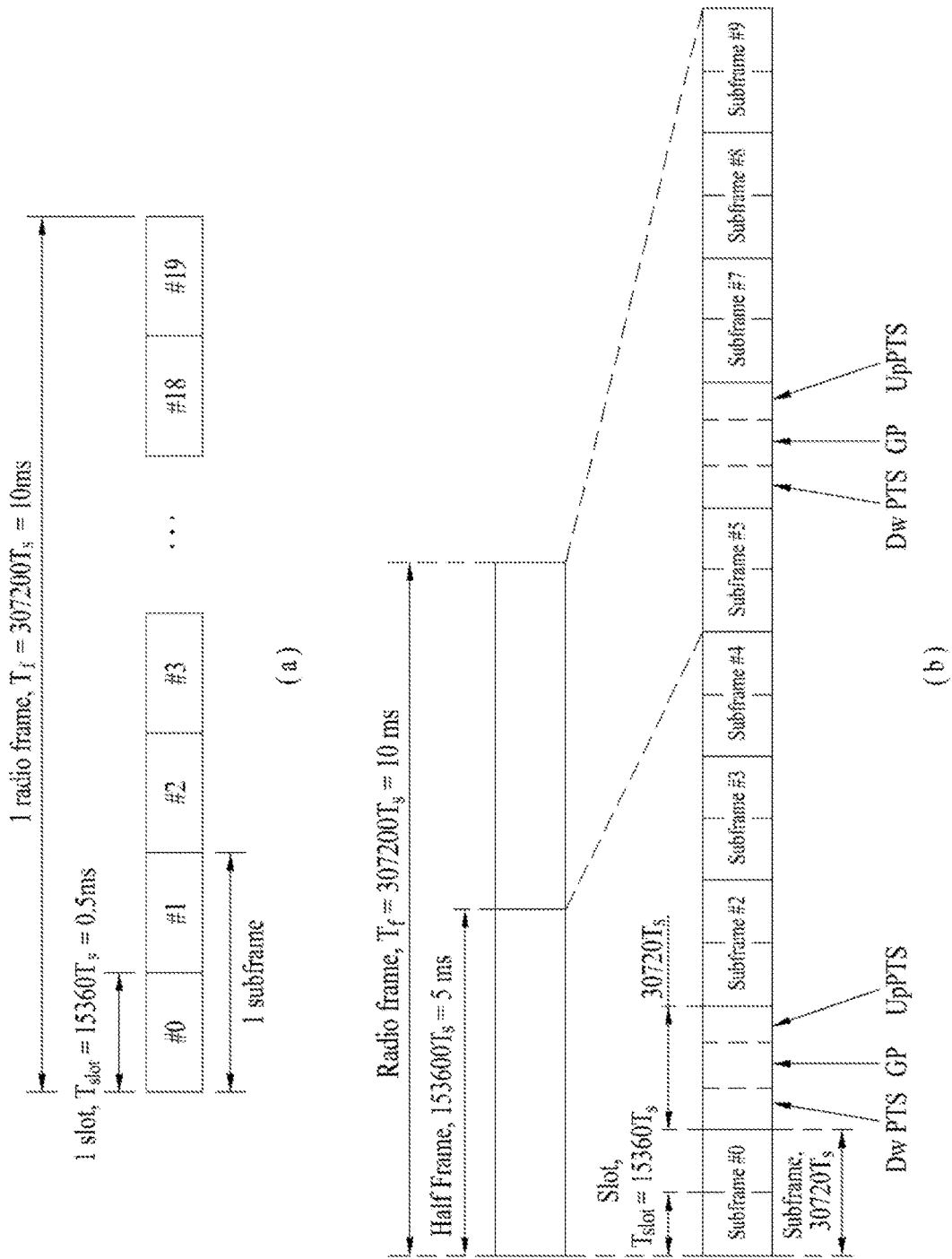
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. The eNB is a terminology used to refer to a BS that supports LTE radio access technologies, and gNB is a terminology used to refer to a BS that supports a new radio access technology network (NR). However, in the following description of the present invention, the BS is referred to as the eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
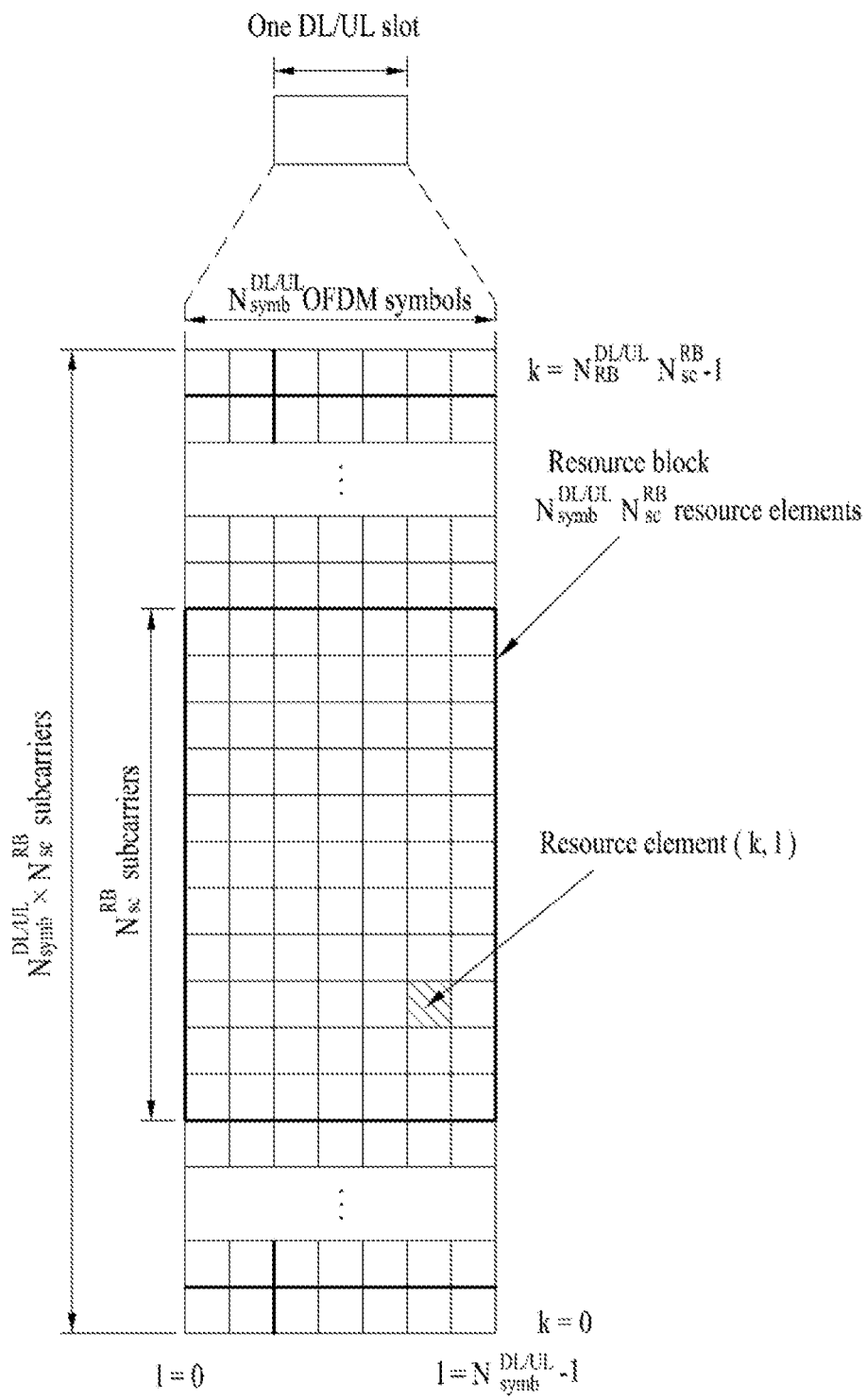
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
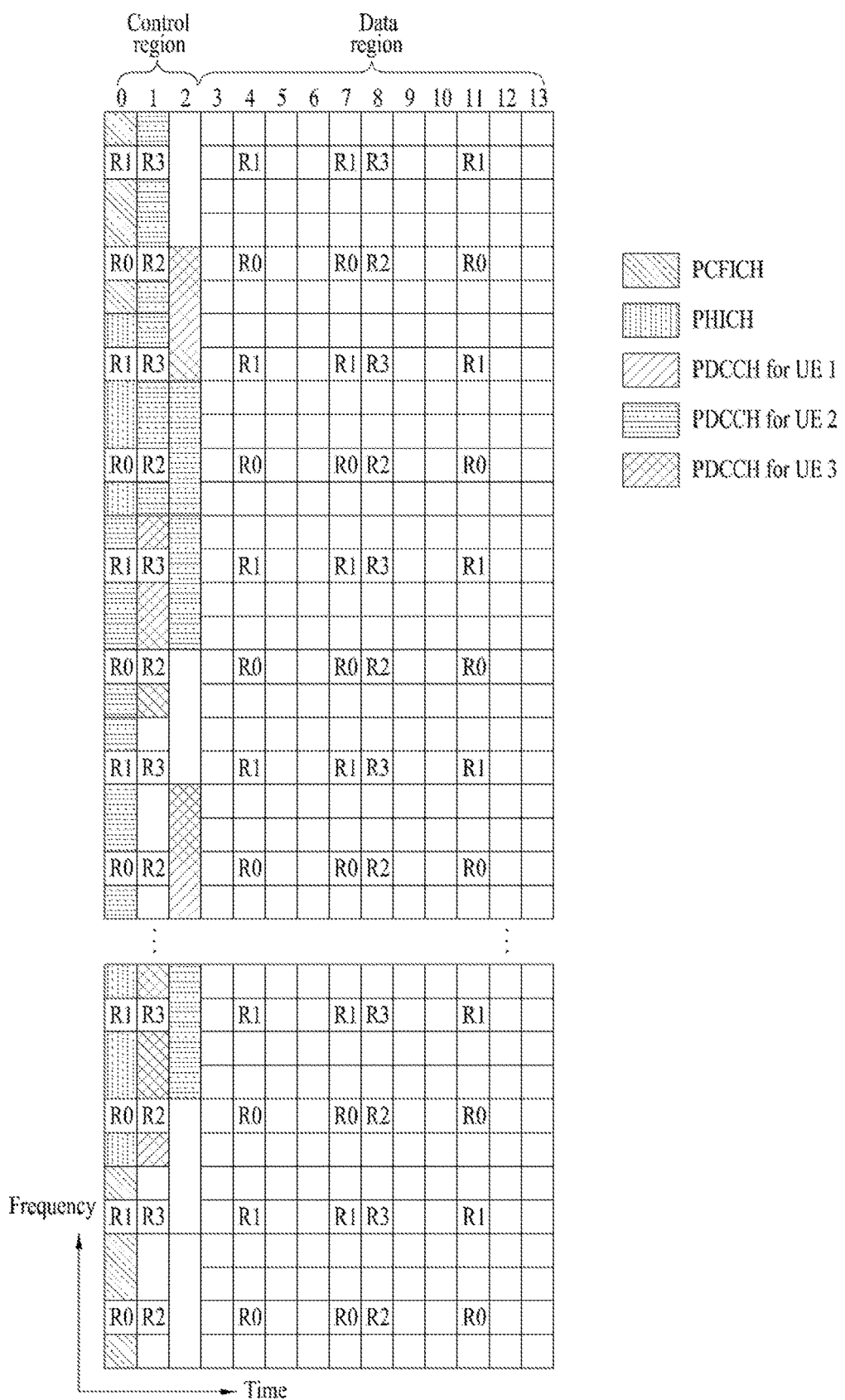
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted in a control region. A UE may monitor the plural PDCCHs. An eNB determines a DCI format according to DCI which is to be transmitted to the UE and attaches a cyclic redundancy check (CRC) to the DCI. The CRC is masked (or scrambled) with an identifier (e.g. a radio network temporary identifier (RNTI)) according to an owner or a usage of a PDCCH. For example, if the PDCCH is dedicated to a specific UE, the CRC may be masked with an identifier (e.g. a cell-RNTI (C-RNTI)) of the UE. If the PDCCH is used for a paging message, the CRC may be masked with a paging identifier (e.g. a paging-RNTI (P-RNTI)). If the PDCCH is used for system information (more specifically, a system information block (SIB)), the CRC may be masked with a system information RNTI (SI-RNTI). If the PDCCH is used for a random access response, the CRC may be masked with a random access-RNTI (RA-RNTI). CRC masking (or scrambling) includes, for example, XOR operation between the CRC and the RNTI at a bit level.

Generally, a DCI format, which may be transmitted to the UE, may differ according to a transmission mode (TM) configured for the UE. In other words, for the UE configured with a specific TM, only certain DCI format(s) corresponding to the specific TM rather than all DCI formats may be used.

A PDCCH is allocated to first m OFDM symbol(s) in a subframe, where m is an integer equal to or greater than 1 and is indicated by a PCFICH.

The PCFICH carries information about the number of OFDM symbols that DCI carried by the PDCCH spans. The PCFICH is transmitted on the first OFDM symbol of a subframe and carries information about the number of OFDM symbols used for transmission of control channels in the subframe. The PCFICH informs the UE of the number of OFDM symbols used in a corresponding subframe in every subframe. The PCFICH is located on the first OFDM symbol. The PCFICH is configured by 4 resource element groups (REGs) and each REG is distributed in the control region based on a cell ID. One REG consists of 4 REs.

The PDCCH is transmitted on an aggregation of one or a plurality of consecutive control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system may be numbered from 0 to $N_{CCE}-1$, wherein $N_{CCE}=floor(N_{REG}/9)$ and $N_{REG}$ denotes the number of REGs which are not allocated to a PCFICH or a PHICH. A PDCCH consisting of n consecutive CCEs may start only on a CCE fulfilling "i mod n=0", wherein i denotes a CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

DCI formats which should be monitored by the UE depend on a transmission mode configured per serving cell. A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

Since the UE cannot infinitely perform blind decoding/blind detection (BD) in a subframe, the number of BDs that the UE can perform in each subframe is defined. The number of PDCCH candidates that the UE should monitor in UE-specific search spaces (USSs) including PDCCH candidates to carry UE-specific DCI is 6 for AL=1, 6 for AL=2, 2 for AL=4, and 2 for AL=8, thus 16 in total, and the number of PDCCH candidates that the UE should monitor in common search spaces (CSSs) including PDCCH candidates to carry common DCI is 4 for AL=4 and 2 for AL=8, thus 6 in total.

Figure 4:
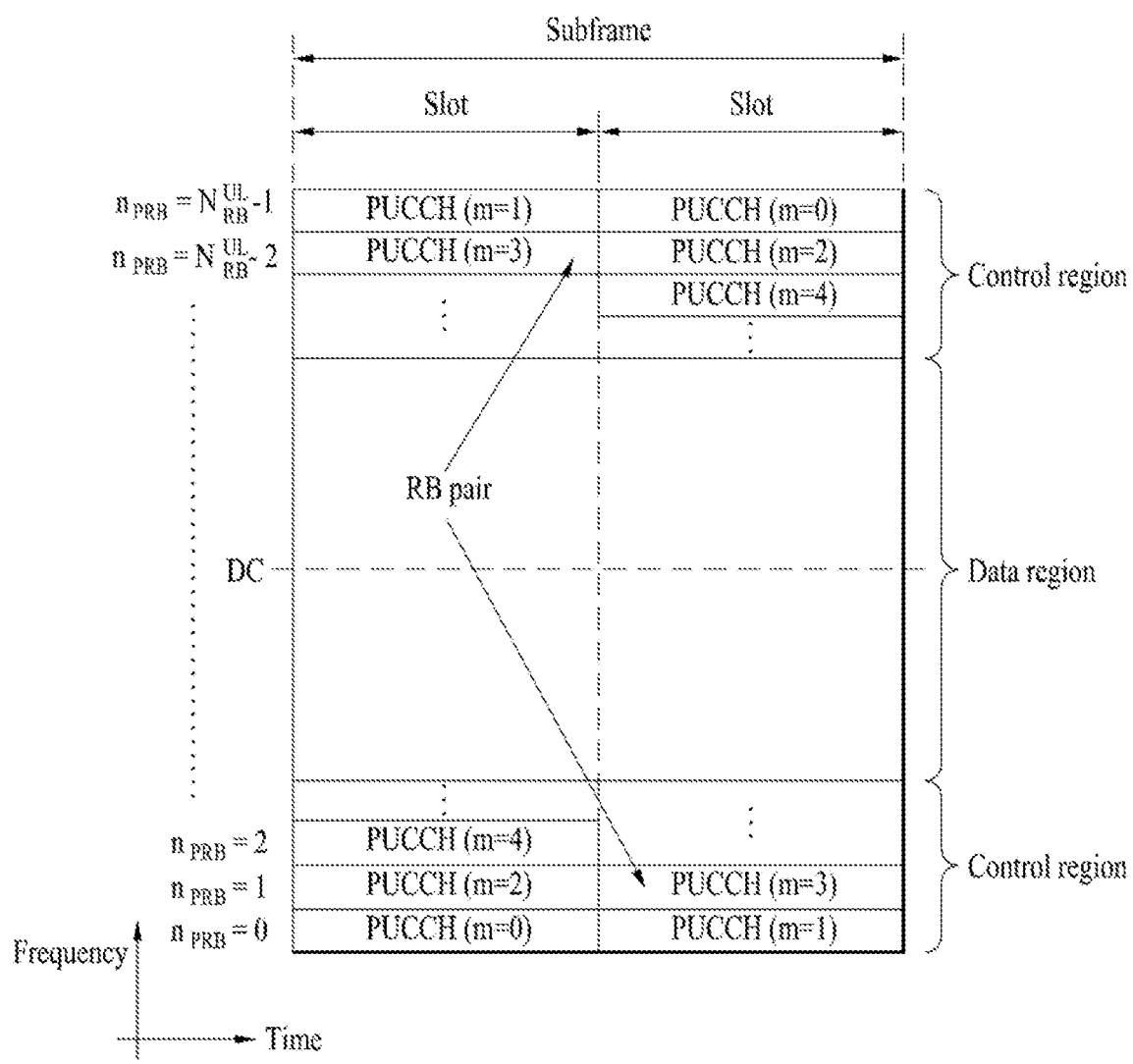
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same sub carriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure.

Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
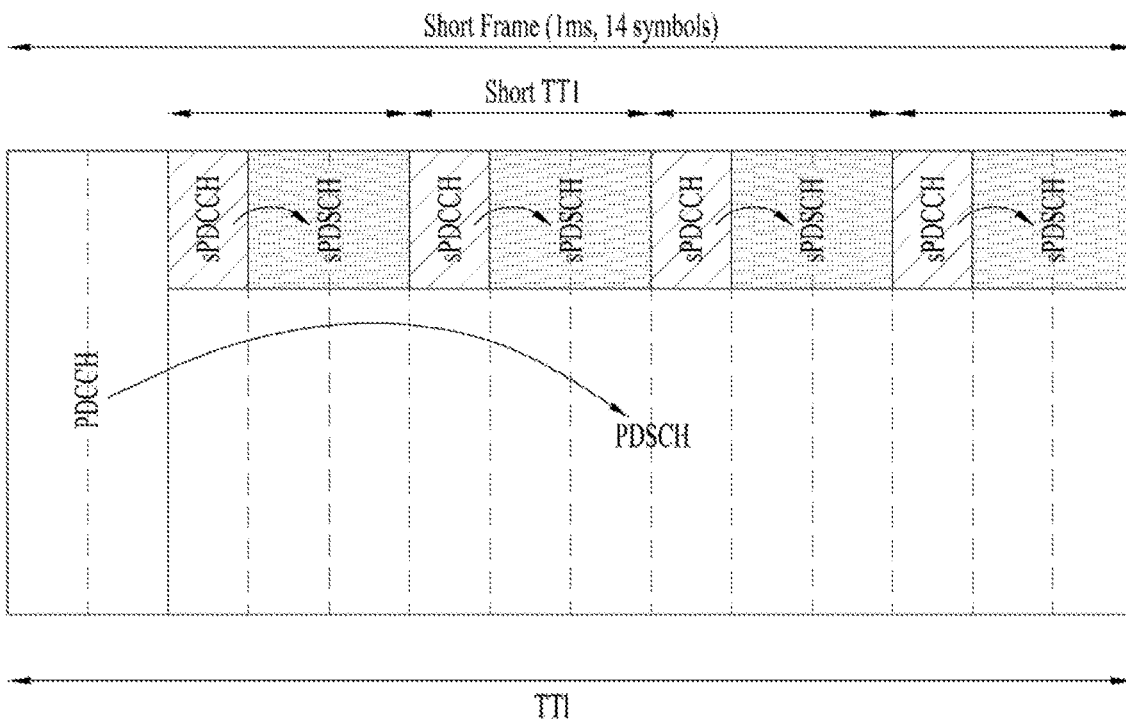
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

In the new RAT (NR) system, a time unit for scheduling a data channel may be referred to as another terminology, for example, slot, instead of the terminology, subframe. The number of slots within a radio frame of the same time length may be varied depending on a time length of each slot. In the present invention, the terminologies, subframe, TTI and slot are used to refer to a basic time unit of scheduling.

<Ofdm Numerology>

The new RAT system uses an OFDM transmission scheme or a similar transmission scheme. For example, the new RAT system may follow the OFDM parameters defined in the following table. Alternatively, a numerology that uses parameters different from those of the following Table may be defined. Alternatively, the new RAT system may conform to numerology of legacy LTE/LTE-A but include a broader system bandwidth (e.g., 100 MHz). For example, the NR system or the NR cell may support a plurality of numerologies having their respective subcarrier intervals. That is, UEs operating with different numerologies may coexist in one cell.

TABLE 1

| Parameter | Value |
| --- | --- |
| Subcarrier-spacing (Δf) | 75 kHz |
| OFDM symbol length | 13.33 us |
| Cyclic Prefix(CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
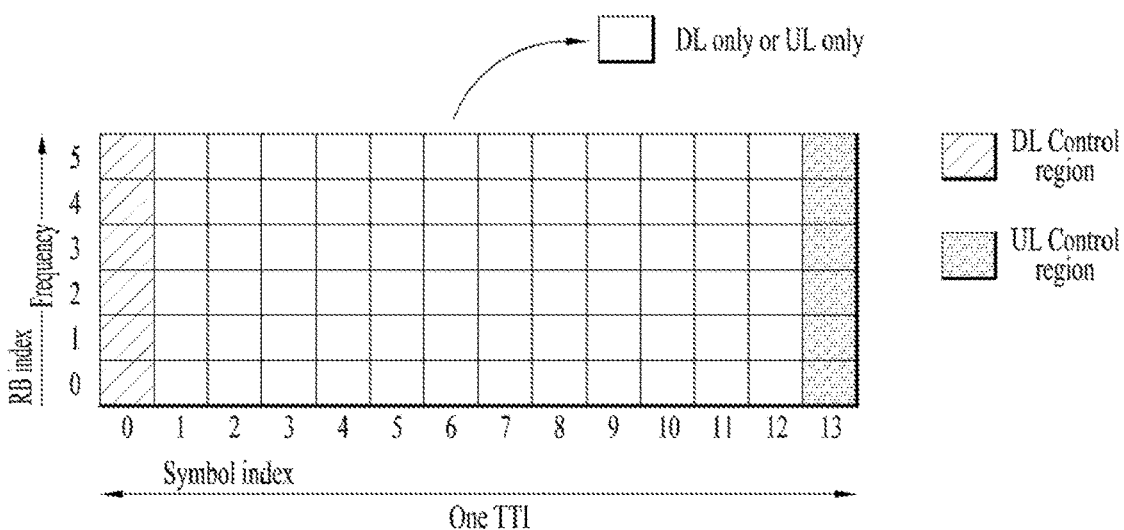
FIG. 6 illustrates a subframe structure available in a new radio access technology (NR) system.

FIG. 6 illustrates a subframe structure available in a new radio access technology (NR) system.

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
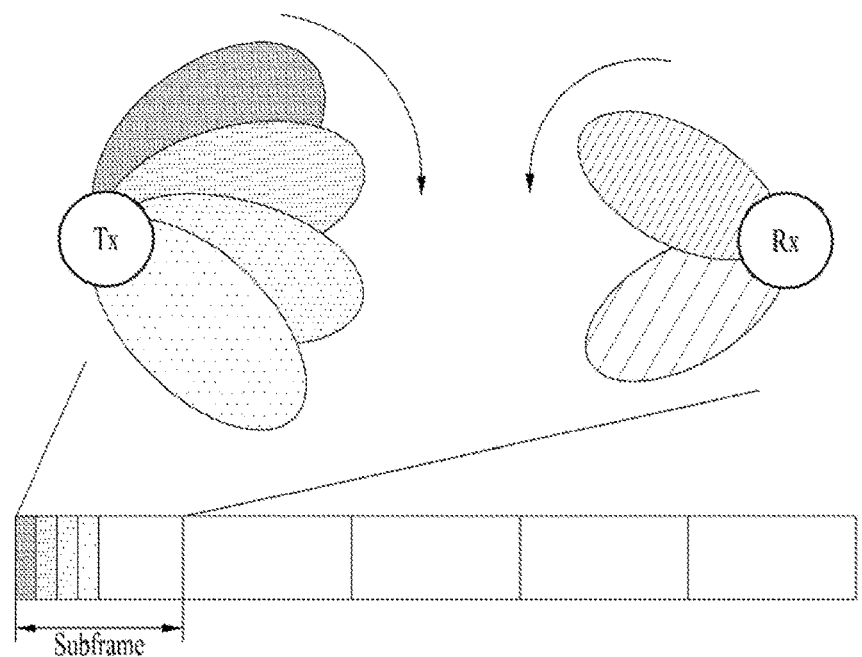
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception (Tx/Rx) analog beam scanning.

Referring to FIG. 7, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

In the present invention, for convenience of description, a channel via which downlink data are transmitted is referred to as a PDSCH, and a channel via which uplink data are transmitted is referred to as a PUSCH. For convenience of description, although the present invention will be described based on a downlink environment (transmission of PDSCH), the present invention may be applied to an uplink environment (transmission of PUSCH).

Figure 8:
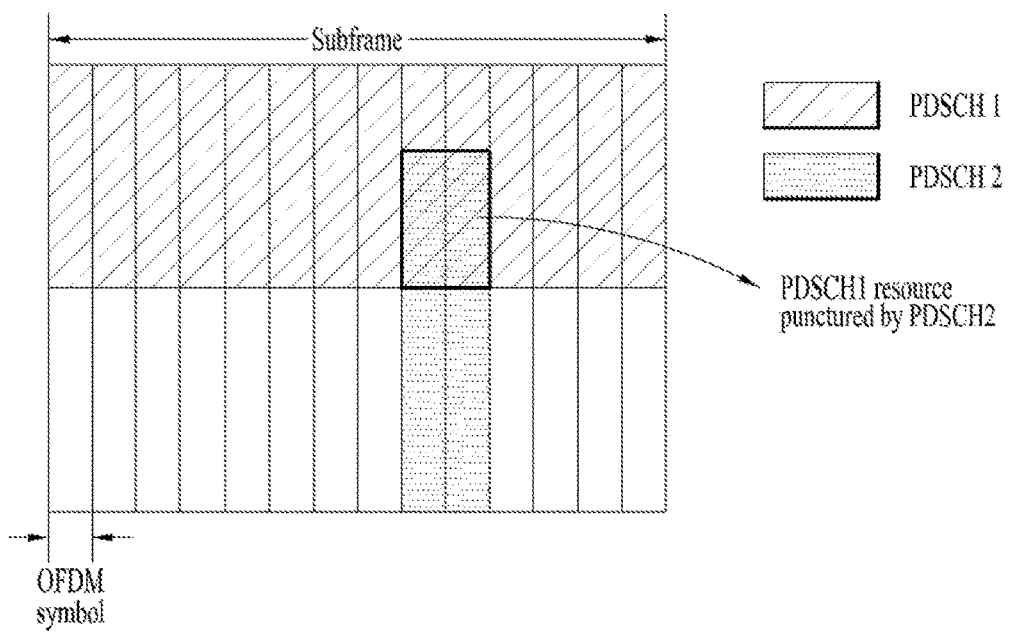
FIG. 8 illustrates that two kinds of data transmissions having their respective properties collide with each other in the same time-frequency resource.

FIG. 8 illustrates that two kinds of data transmissions having their respective properties collide with each other in the same time-frequency resource.

If data (e.g., URLLC data) in which latency is regarded as an important factor and data (e.g., eMBB data) in which latency is regarded as a relatively less important factor are multiplexed into the same frequency resource of the same cell and then transmitted, transmission of the former data may collide with transmission of the latter data in the same time-frequency resource. Since a priority is generally given to the transmission of the former data, as shown in FIG. 8, transmission may be performed in such a manner that PDSCH1 resource corresponding to the data in which latency is regarded as a less important factor is punctured by PDSCH2 corresponding to the data in which latency is regarded as an important factor. In this case, PDSCH1 corresponding to the data in which latency is less important is transmitted at a length longer than that of PDSCH2 corresponding to the data in which latency is important. Therefore, some OFDM symbol(s) region of PDSCH1 corresponding to the data in which latency is less important is punctured for transmission of PDSCH2 corresponding to the data in which latency is more important. In this case, data of which resource region is punctured experience interference in the corresponding resource, whereby great throughput deterioration is generated. Also, if a UE which decodes PDSCH1 does not know the presence of PDSCH2 which has punctured the PDSCH1 resource, since the data of the punctured resource position are decoded by being recognized as the data of PDSCH1, an error rate may be increased. Therefore, a method for improving reception throughput of data punctured for transmission of another data is required.

Figure 9:
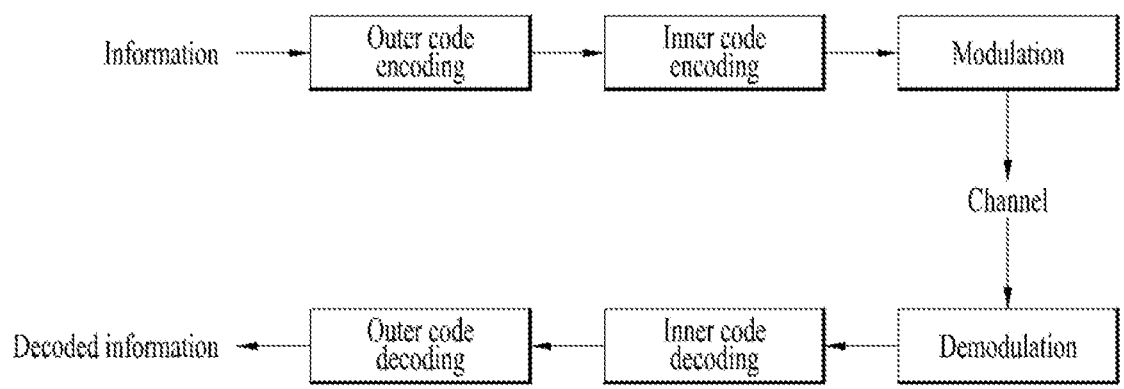
FIG. 9 illustrates a brief flow of a channel coding procedure and a channel decoding procedure.

FIG. 9 illustrates a brief flow of a channel coding procedure and a channel decoding procedure.

For the purpose of throughput improvement of channel coding and recovery of some data of which reception has been failed, as shown in FIG. 9, information to which a plurality of channel codes (generally, 2 channel codes) not one channel code are sequentially applied may be transmitted/received. At this time, of the two channel codes, a channel code located at the outer side of a transmission procedure (that is, channel code of which encoding is performed earlier in encoding order and of which decoding is performed later in decoding order) is referred to as an outer code, and a channel code located at the inner side of the transmission procedure (that is, channel code of which decoding is performed earlier in decoding order and of which encoding is performed later in encoder order) is referred to as an inner code.

Various channel codes may respectively be used as the outer code and the inner code. Generally, an erasure code such as a single parity code (SPC), a hamming code, Bose-Chaudhuri-Hocquenghem (BCH) code, or Reed Solomon (RS) code may be used as the outer code, and a convolution code, a turbo code, a low-density parity check (LDPC) code, or a polar code may be used as the inner code. In this case, the SPC means a code that obtains a parity bit of 1 bit by XOR computation (that is, d1 XOR d2 XOR . . . XOR dn) for all of information bits (that is, d1, d2, dn). Since the other channel codes are known in the field of channel coding, their description will be omitted.

Hereinafter, for convenience of description, the outer code is referred to as an outer channel code, and the inner code is referred to as an inner channel code or a channel code.

Figure 10:
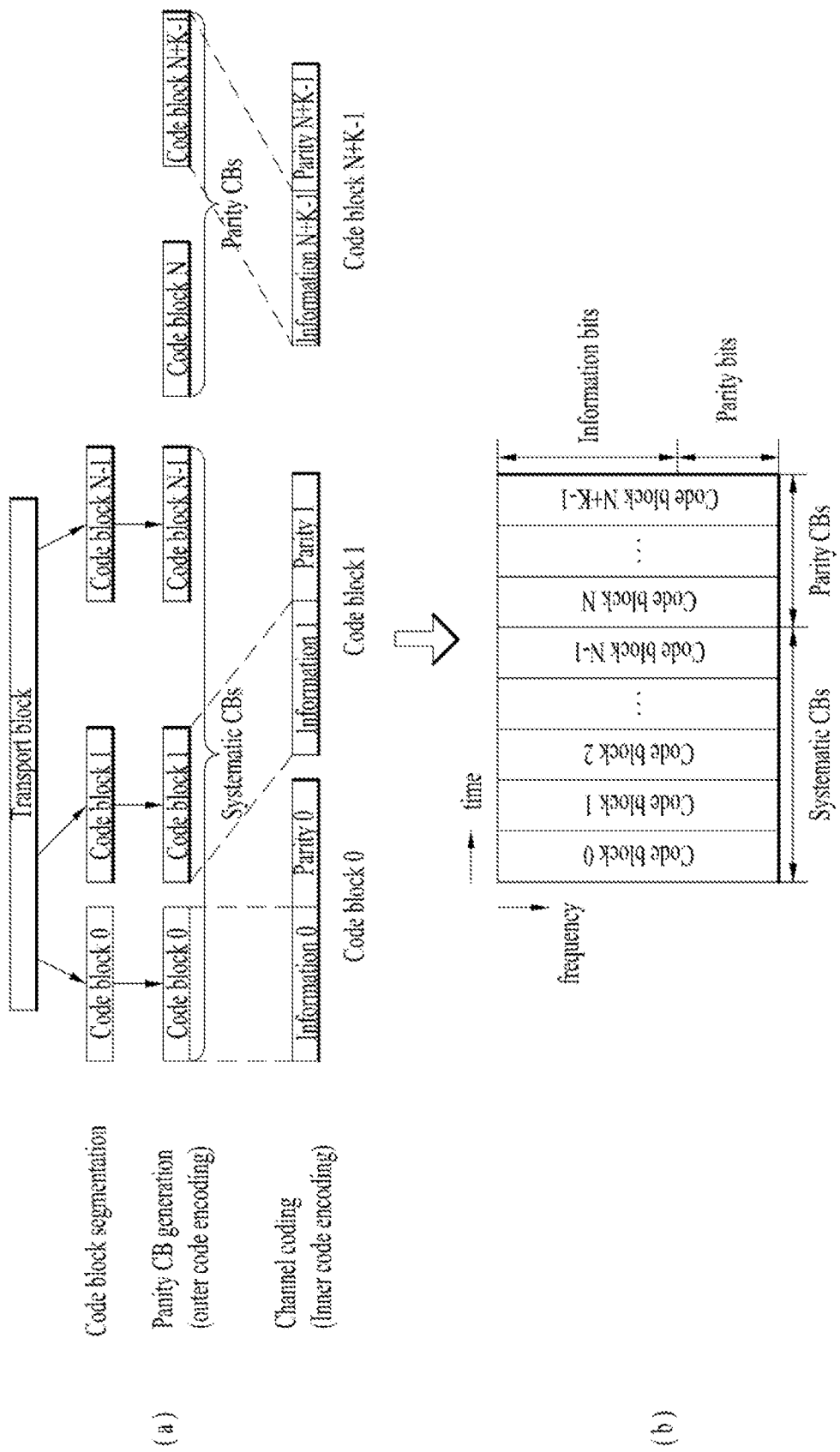
FIG. 10 illustrates a concept of outer encoding and inner encoding and data mapping according to the present invention.

FIG. 10 illustrates a concept of outer encoding and inner encoding and data mapping according to the present invention.

Meanwhile, the erasure code may be used as the outer code. Erasure code encoding makes parity code blocks (CBs) which are auxiliary blocks to be appended in CBs constituting a transport block (TB). Inner code encoding generates, from these, code blocks having parity bits added. Referring to FIG. 10(a). if TB is segmented by N CBs, the N CBs are subjected to outer code encoding, whereby K parity CBs are generated and a total of N+K CBs are input to inner code encoding. The inner code encoding generates N+K output CBs by adding parity bits to each of the total N+K CBs.

In the current LTE/LTE-A system, the CBs are mapped into OFDM symbols in accordance with a staggering scheme in such a manner that a part of one CB is partially mapped into OFDM symbol x and the remaining part of the one CB is mapped into OFDM symbol x+1. Therefore, one CB is split to be mapped into two OFDM symbols, wherein one OFDM symbol does not have a whole of one CB but has a part of the one CB, and one OFDMM symbol has at least two CBs partially mapped therein. Therefore, if CBs of data are mapped into the time-frequency resource in accordance with a mapping scheme used in the current LTE/LTE-A system, the plurality of CBs may be damaged when one OFDM symbol into which the data are mapped is punctured. To solve this problem, the present invention suggests a method for successfully receiving data in a receiving device if other data are transmitted on some resource (e.g., OFDM symbol) region on which data are transmitted in a subframe in the NR environment. The present invention will be described considering that some resource (e.g., OFDM symbol) region on which data are transmitted is punctured and other data are transmitted on the punctured resource. However, the present invention described hereinafter may be applied to even the case that the receiving device cannot receive the data on the some resource normally due to inter-cell interference. Also, the present invention may be applied to even the case that data transmitted at the legacy TTI or a longer TTI are punctured by data transmitted at a shortened TTI in the LTE/LTE-A system as well as the NR environment.

To enhance reception throughput of data of which some resource region is punctured, the following schemes may be considered in the receiving device.

Solution A) After a non-transmitted resource region due to other data of resources of corresponding data is punctured, reception and decoding of the corresponding data are performed.

Solution B) The non-transmitted data (or data failed to be successfully received) are recovered using an outer erasure code.

The present invention suggests a data mapping method for improving throughput if a scheme such as solution B is used to enhance reception throughput of data of which some resource region is punctured.

If the solution B is applied, the following transmission procedure may generally be considered as follows. As illustrated in FIG. 10, if a TB to be transmitted exists, the TB may be segmented into N CBs. The transmitting device may obtain K parity CBs by encoding the N CBs using an outer code. The transmitting device may perform channel coding (that is, inner code encoding) for each of a total N+K CBs. As a result, parity bits are added to each CB. Referring to FIG. 10(b), the N+K CBs to which parity bits are added may be mapped into a data transmission region. For example, one CB may be mapped into one OFDM symbol region, and different CBs may be mapped into different OFDM symbol regions. In this case, even though one or a plurality of CBs are not transmitted due to puncturing, if a position of CB which is not received successfully is identified, the receiving device may recover CB(s) which is (are) not received properly, through outer code decoding by using the parity CBs.

At this time, outer code encoding may be performed after channel code (that is, inner code) encoding as the case may be. That is, encoding for adding parity to each CB may first be performed, and encoding for generating K parity CBs may be performed later. However, in case of decoding, the receiving device should recover CB(s) constituting TB by first recovering CBs using parity per information block and recovering systematic CB(s) of the CBs, which are not received properly, using the parity CBs.

In order that the receiving device may determine CBs which are not received successfully, the following methods may exist.

a) The transmitting device performs cyclic redundancy check (CRC) attachment for each CP after segmenting a TB into a plurality of CBs, whereby the receiving device may determine whether each CB has been successfully decoded (or received) after channel code decoding (that is, inner code decoding).

b) The receiving device may previously know a position (e.g., OFDM symbol position and position (index) of CB) of a resource greatly affected by interference due to other data, or may be configured, by the transmitting device, a position (e.g., OFDM symbol position and position (index) of CB) of a resource in which transmission of corresponding data is punctured or which is greatly affected by interference due to transmission of other data. For example, whether CBs of initial transmission (or CBs of previous transmission) include punctured CBs may be indicated to the UE through retransmission grant DCI. If the CBs include punctured CBs, the punctured CBs among the CBs of initial transmission or previous transmission may explicitly or implicitly be indicated through the retransmission grant DCI.

If the method such as the aforementioned solution A is used to enhance reception throughput of data corresponding to the punctured CBs or some resources, the receiving device should know a position of resources/CBs where data is punctured. Generally, since data (e.g., PDSCH2 of FIG. 8) for which latency is important is transmitted while data (e.g., PDSCH1 of FIG. 8) for which latency issue is less important is being transmitted, the UE which receives PDSCH1 does not know transmission of PDSCH2 and transmission resources of PDSCH1. Therefore, the UE should be indicated information (e.g., OFDM symbol position and CB index) of punctured resources among PDSCH resources received from the eNB. Also, even in the case that the scheme such as the aforementioned solution B is used, the UE may be indicated information (e.g., OFDM symbol position and CB index) on punctured resources among the PDSCH resources received from the eNB, whereby the UE may determine a data region where received data is punctured and recovery is performed through an outer erasure code.

The present invention may be applied to even the case that the transmitting device transmits only systematic CB without transmitting parity CB when transmitting data. In the aforementioned description of the present invention, a value of K may be 0.

Figure 11:
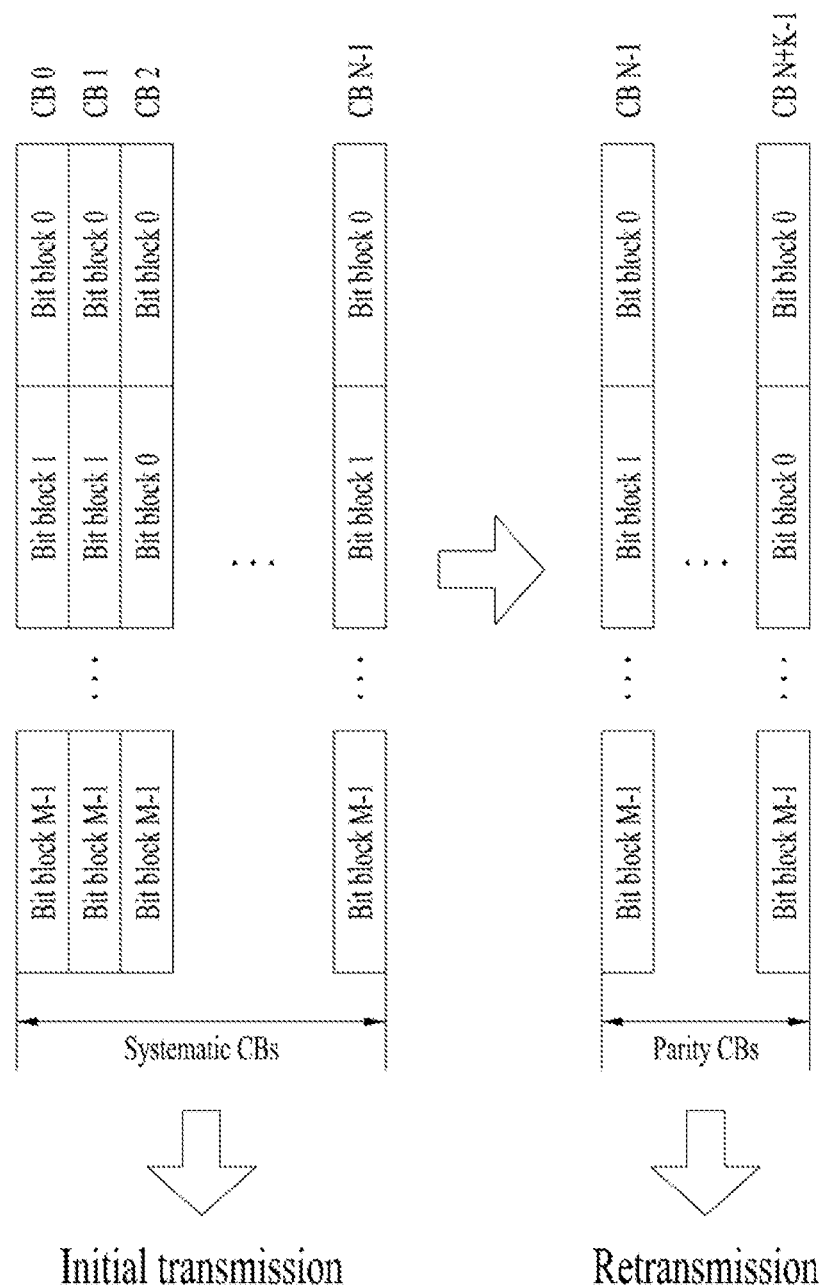
FIG. 11 illustrates an example of the present invention for transmitting/receiving code blocks.

FIG. 11 illustrates an example of the present invention for transmitting/receiving code blocks.

The transmitting device may transmit parity CBs during initial transmission (that is, the number K of parity CBs which are initially transmitted>0), or may transmit systematic CB(s) only without transmitting parity CBs (that is, the number K of parity CBs which are initially transmitted=0). Considering overhead caused by parity CB transmission, the present invention suggests that the transmitting device should transmit systematic CB(s) only during initial transmission and transmit parity CB(s) during retransmission. For example, as illustrated in FIG. 11, N systematic CBs may be transmitted during initial transmission, and K parity CBs generated from the systematic CBs may be transmitted during retransmission only.

Alternatively, minimum parity CB(s) may be transmitted together with the systematic CB(s) during initial transmission, and additional parity CBs may be transmitted during retransmission.

The present invention suggests a method for transmitting parity CBs during retransmission. The present invention may be applied to the case that systematic CBs are only transmitted during initial transmission and the case that the systematic CBs and the parity CBs are transmitted.

<A. Generation of Parity CBs for Retransmission>

The transmitting device may transmit parity CBs only or transmit both parity CBs and systematic CBs together during retransmission of data. At this time, the number of transmitted parity CBs that are generated from the systematic CBs may always be fixed to a specific number. Alternatively, the number of transmitted parity CBs that are generated from the systematic CBs may be varied depending on the number of systematic CBs (e.g., CBs for which the UE has failed in reception and/or CBs which are not transmitted normally due to puncturing) which are not transmitted successfully during initial transmission. For example, if the number of systematic CBs which are not transmitted successfully is 1, the transmitting device generates and transmits one parity CB, but if the number of systematic CBs which are not transmitted successfully is 2 or more than 2, two parity CBs may be generated and transmitted.

Meanwhile, the present invention suggests that the transmitting device should retransmit all systematic CBs or all CBs transmitted during initial transmission instead of transmitting parity CBs during retransmission if the number of systematic CBs which are not transmitted successfully during initial transmission or previous retransmission is a specific number or more.

To this end, in a downlink environment, the UE may feed the number and/or position information of systematic CBs, which are not received successfully, back to the eNB after receiving data. Alternatively, the UE may feed the number of parity CBs, which should be transmitted to the UE by the eNB, back to the eNB when the eNB performs retransmission of the data. This feedback information may be transmitted through PUCCH. Afterwards, when transmitting PDCCH or DCI for scheduling data retransmission to the UE, the eNB may indicate the number of parity CBs which will be transmitted during corresponding retransmission.

Also, in an uplink environment, the eNB may indicate the number and/or position information of systematic CBs, which are not received successfully, to the UE after receiving data from the UE. Alternatively, the eNB may indicate the number of parity CBs, which should be transmitted by the UE during retransmission, to the UE. This indication may be transmitted by being included in PDCCH or DCI for scheduling data retransmission.

When the number of parity CBs transmitted during data retransmission is indicated through DCI, this information may be transmitted through an explicit field of DCI. As the case may be, if all systematic CBs or all CBs transmitted during initial transmission are retransmitted instead of parity CBs during retransmission, this information may be indicated through a corresponding field. For example, this explicit field may include 1 bit, and may indicate 'no parity CB transmission (or only systematic CB transmission)' or 'transmission of one parity CB' in accordance with a value of the field. Alternatively, this explicit field may include 2 bits, and may indicate 'no parity CB transmission (or only systematic CB transmission)', 'transmission of one parity CB', or 'transmission of two parity CBs', or 'transmission of three parity CBs' in accordance with a value of the field.

Otherwise, the number of parity CBs transmitted during data retransmission may be indicated implicitly through a modulation and coding scheme (MCS) field. For example, if specific value(s) is(are) transmitted in the MCS field, it may indicate that data are retransmitted. In this case, the number of parity CBs transmitted during data retransmission may be notified by an MCS value within the MCS field. As the case may be, if all systematic CBs or all CBs transmitted during initial transmission are retransmitted instead of parity CBs during retransmission, this fact may be indicated by a specific MCS value.

Alternatively, the number of parity CBs may be determined depending on MCS index, TB size (or TBS index) or the number of (systematic) CBs. At this time, the number of CBs may mean the number of systematic CBs (that is, the number of CBs in which transport blocks are divided) transmitted during initial transmission. Alternatively, considering that some of the systematic CBs are only retransmitted during retransmission, the number of CBs may mean the number of systematic CBs transmitted during each (re-)transmission.

Alternatively, the number of parity CBs transmitted during data retransmission may be indicated semi-statically through a radio resource control (RRC) signal.

Considering that the transmitting device transmits parity CBs of an outer code even in case of initial transmission, the aforementioned method(s) indicating the number of parity CBs may be applied to the case of initial transmission. For example, indication on the number of parity CBs may be performed every transmission regardless of initial transmission and retransmission. Alternatively, instead of the number of parity CBs for transmission, application of outer coding may be indicated during transmission of data. In this case, instead of the number of parity CBs, whether to apply outer coding to data may be indicated by the aforementioned method(s) indicating the number of parity CBs.

The eNB may provide the UE with information indicating whether the CBs include punctured CBs. The presence of the punctured CBs may be indicated through DCI. For example, information indicating whether CBs of initial transmission or previous transmission of data include punctured CBs may be transmitted through retransmission DCI for scheduling retransmission of the data. The retransmission DCI may include information indicating punctured CB(s) and/or non-punctured CB(s) among CBs of initial transmission or previous transmission of data. The eNB may transmit DCI for retransmission of the punctured CB(s) separately from DCI for retransmission of non-punctured CB(s).

As described later in section C, RV value used for retransmission of punctured CBs may be different from RV value used for retransmission of non-punctured CBs. DCI (hereinafter, puncturing CB DCI) for retransmission of the punctured CB(s) and DCI (hereinafter, non-puncturing CB DCI) for retransmission of non-punctured CB(s) may be transmitted separately from each other. Puncturing CB DCI may include information on RV value used for retransmission of puncturing CB(s), and non-puncturing CB DCI may include information on RV value used for retransmission of non-puncturing CB(s). A specific RV value (e.g., RV 0) may be used for retransmission CB of the punctured CB, and the receiving device which has received CB of RV 0 may regard that the corresponding CB corresponds to new transmission. Therefore, the receiving device may flush bit(s) corresponding to previous transmission of the corresponding CB from a buffer. The transmitting device may apply the specific RV value to the corresponding CB when retransmitting the punctured CB. If CB having a specific RV value is received, the receiving device may know that the corresponding CB is the CB punctured during initial transmission or previous transmission. The eNB may notify the UE of a set of CB(s) having RV value of 0 and a set of CB(s) having no RV value of 0 through one DCI or separate DCI.

If the receiving device identifies that some of CBs of data have been punctured through the transmission procedure, for example, if the eNB notifies the UE that some of data transmitted to PDSCH have been punctured or schedules the UE to puncture some of data transmitted to PDSCH, the receiving device may flush all CBs received during transmission of corresponding data having the punctured CBs from the buffer. Alternatively, since a soft buffer is managed in a unit of CB, if the receiving device identifies the punctured CBs among the CBs received during initial transmission or previous transmission, the receiving device may flush only bit(s) corresponding to the corresponding punctured CBs from the buffer.

<B. Parity CB Resource Mapping>

PRB Size and Parity CB Resource Mapping

Figure 12:
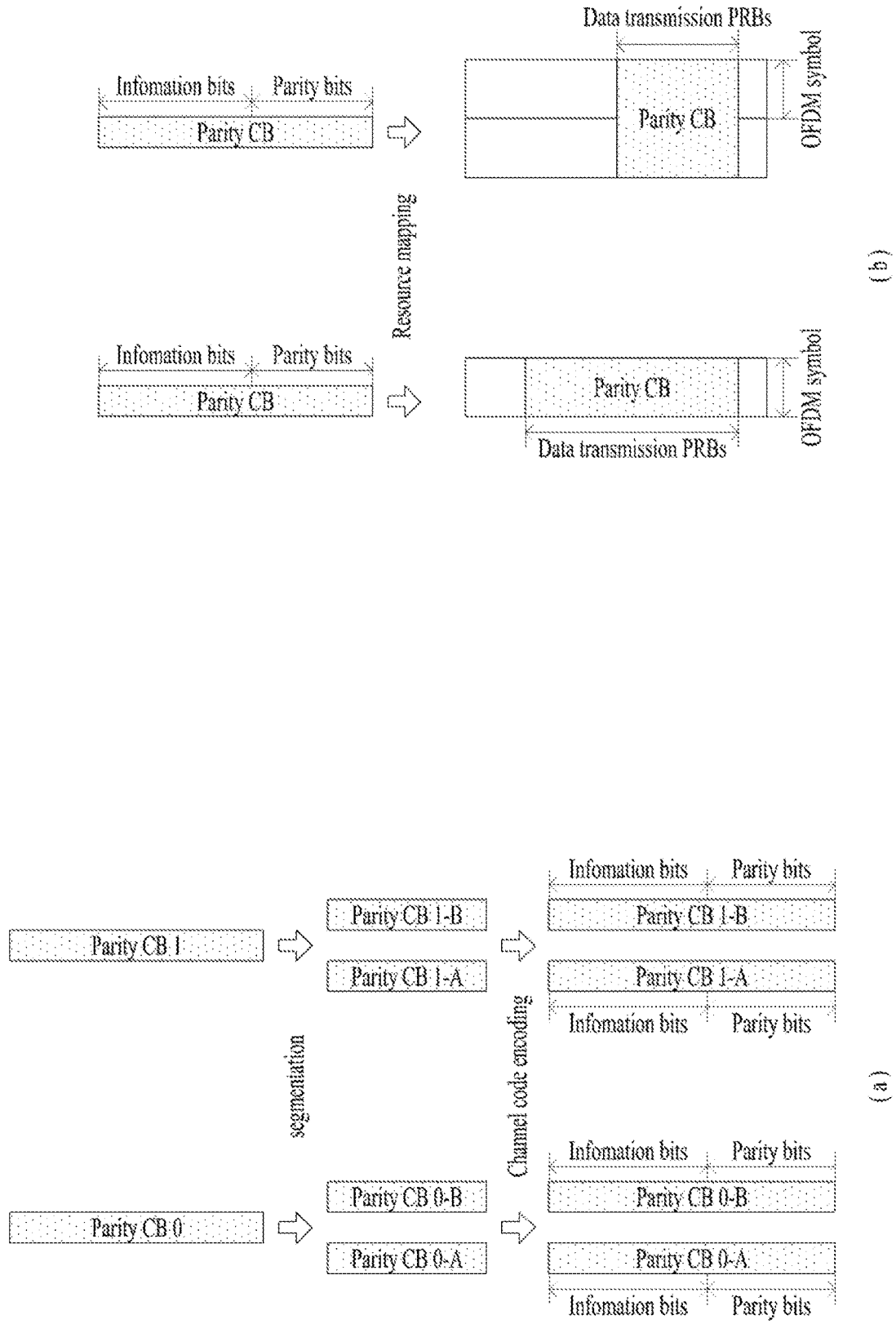
FIG. 12 illustrates resource mapping examples of parity code block (CB) according to the present invention.

FIG. 12 illustrates resource mapping examples of parity code block (CB) according to the present invention.

A size of a physical resource block (PRB) (that is, the number of PRBs) used for transmission of data during retransmission may be different from that of PRB used for transmission of data during initial transmission. In this case, for example, if the PRB size of retransmission is smaller than the PRB size of initial transmission, a problem may occur in that a code rate of parity CBs is too increased. To solve this problem, the following method(s) may be used.

Method 1. Parity CB Segmentation

If a parity CB code rate (that is, value, N/T obtained by dividing the number N of information bits of parity CBs by the number T of bits that may be transmitted through the amount of resources on which parity is transmitted) is a specific value or more, the transmitting device may segment the information bits of the parity CBs. Therefore, a plurality of parity CBs segmented by one parity CB may be configured. For example, referring to FIG. 12(a), when parity CB 0 and parity CB 1 exist, each parity CB may be segmented into two parity CBs if a code rate of parity CB 0 and a code rate of parity CB 1 are specific values or more. Parity CB 0 may be segmented into parity CB 0-A and parity CB 0-B, and parity CB 1 may be segmented into parity CB 1-A and parity CB 1-B. At this time, the transmitting device may perform CRC attachment for each of the segmented parity CBs (e.g., parity CB 0-A, parity CB 0-B, parity CB 1-A and parity CB 1-B in FIG. 12(a)). Alternatively, to reduce unnecessary overhead, CRC attachment may not be performed for the segmented parity CBs. Afterwards, the transmitting device may generate parity bits by performing channel code encoding for each of the segmented parity CBs.

Method 2. Parity CB Transmission Resource Extension

If a parity CB code rate (that is, value, N/T obtained by dividing the number N of information bits of parity CBs by the number T of bits that may be transmitted through the amount of resources on which parity is transmitted) is a specific value or more, the amount of resources on which each parity CB is transmitted may be increased. For example, the number of OFDM symbols in which each parity CB is transmitted may be increased. For example, if the parity CB code rate is a specific value or more, the eNB may increase the number of OFDM symbols, into which one parity CB is mapped, as much as twice from the number of OFDM symbols into which one parity CB is mapped during initial transmission. Referring to FIG. 12(b), it is assumed that one CB is mapped into one OFDM symbol region during initial transmission. In this case, the parity CB code rate is a specific value or more during retransmission, one parity CB may be mapped into two OFDM symbols.

Parity CB Resource Mapping According to the Number of Parity CBs

Figure 13:
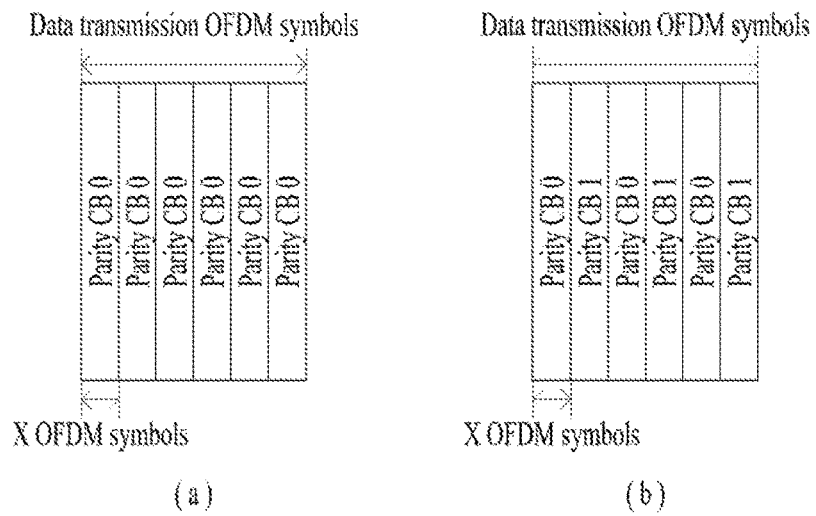
FIG. 13 illustrates parity CB resource mapping methods according to the number of parity CBs in the present invention.

FIG. 13 illustrates parity CB resource mapping methods according to the number of parity CBs in the present invention.

Parity CBs may only be transmitted without systematic CBs during retransmission. In this case, the parity CBs may be subjected to resource mapping as follows in accordance with the number of parity CBs which are transmitted.

If the number of parity CBs which are transmitted is 1 and one CB is mapped into X OFDM symbols, as illustrated in FIG. 13(a), the corresponding parity CB may repeatedly be transmitted within a region of OFDM symbol(s), in which data are transmitted, on a time axis.

If the number of parity CBs which are transmitted is 2 or more and one CB is mapped into X OFDM symbols, a plurality of parity CBs may repeatedly be transmitted within a region of OFDM symbol(s), in which data are transmitted, on a time axis. For example, if the number of parity CBs is 2, after one parity CB (e.g., parity CB 0) is repeatedly transmitted, the second parity CB (e.g., parity CB 1) may repeatedly be transmitted. Alternatively, to obtain time diversity effect and reduce latency, as illustrated in FIG. 13(b), a plurality of parity CBs may alternately and repeatedly be transmitted within the region of OFDM symbol(s) in which data are transmitted.

CB Resource Mapping in Case of Transmission of Systematic CBs Together with Parity CBs Parity CBs may be transmitted together with systematic CBs during retransmission. At this time, the transmitting device may transmit the systematic CBs and the parity CBs in accordance with the following methods.

Method a. If the eNB and the UE may identify the position of the systematic CBs which are not transmitted normally, the systematic CB(s) which is(are) not transmitted normally and the parity CBs may be transmitted during retransmission. For example, a front part of data transmission OFDM symbol(s) may be used for transmission of the systematic CB(s) which is(are) not transmitted normally, and the other part may be used for transmission of the parity CB(s). The parity CB(s) may be transmitted within the region of OFDM symbol(s), in which parity CB(s) is(are) transmitted, in accordance with the method suggested in the aforementioned sub-section 'parity CB resource mapping according to the number of party CBs'. In the method a, the data transmission OFDM symbol(s) may mean a region of OFDM symbol(s) in which parity CBs are transmitted.

Method b. Considering that the eNB and the UE do not know the position of the systematic CBs which are not transmitted normally, some of the systematic CB(s) and the parity CBs may be transmitted during retransmission. Some of the systematic CB(s) may be selected as much as a specific number from the systematic CBs having the lowest index. Alternatively, some of the systematic CB(s) may randomly be selected as much as a specific number by a specific Equation. In this case, for example, a front part of data transmission OFDM symbol(s) may be used for transmission of the systematic CB(s) which is(are) not transmitted normally, and the other part may be used for transmission of the parity CB(s). The parity CBs may be transmitted within the region of OFDM symbol(s), in which parity CBs are transmitted, in accordance with the method suggested in the aforementioned sub-section 'parity CB resource mapping according to the number of party CBs'. In the method b, the data transmission OFDM symbol(s) may mean a region of OFDM symbol(s) in which parity CBs are transmitted.

<C. CB Level Retransmission>

Figure 14:
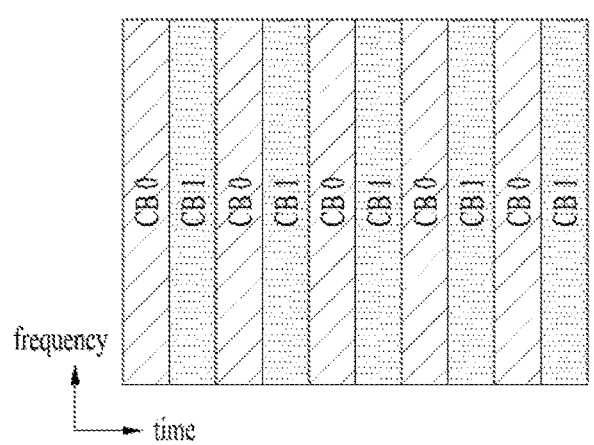
FIGS. 14 and 15 illustrate CB level retransmission methods according to the present invention.
Figure 15:
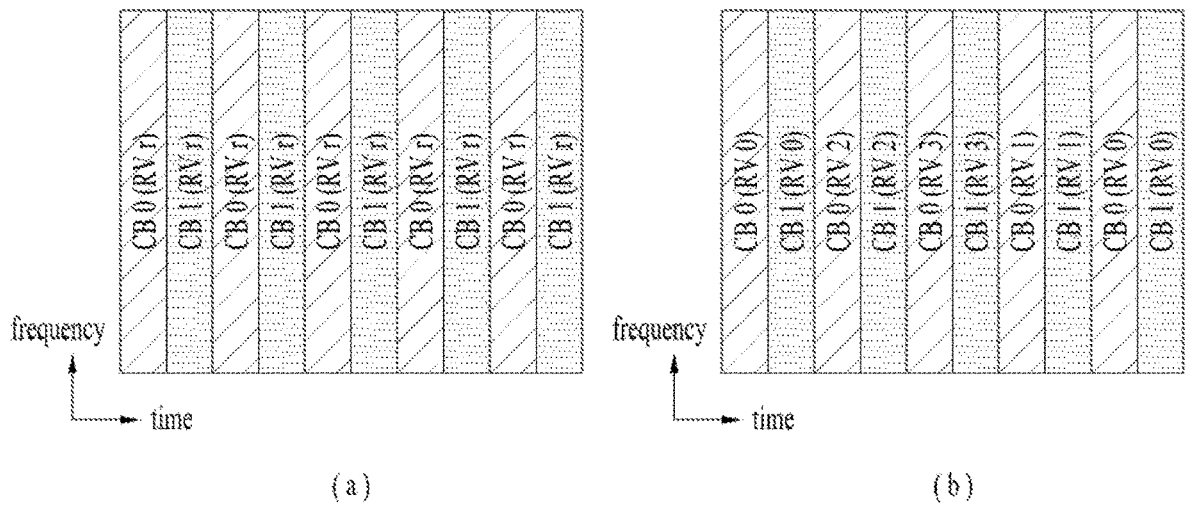

FIGS. 14 and 15 illustrate CB level retransmission methods according to the present invention.

Pre-emption (that is, puncturing of eMBB transmission) of eMBB DL transmission may be considered by URLLC data to multiplex eMBB and URLCC within the same cell. In this case, some of resources for eMBB data transmission may be punctured and affected by interference from URLLC traffic, and throughput of eMBB data transmission is affected by URLLC traffic. URLLC traffic of a neighboring cell may affect eMBB data. That is, URLLC traffic from an inter-cell may be interference on some of resources for eMBB transmission, and throughput of eMBB may be deteriorated.

Unlike the legacy scheme in which all CBs are retransmitted, erroneous CB(s) of previous transmission or initial transmission may only be retransmitted to reduce an influence of URLLC traffic. When the CBs are retransmitted, resources for the retransmitted CBs may be increased for BLER throughput gain. Alternatively, when the CBs are retransmitted, a total of resources for retransmission may be reduced for spectral efficiency. This scheme may require UE feedback for the number or position of erroneous CBs or eNB indication of information on CBs for retransmission. For example, the eNB may transmit DCI for retransmission of punctured CB(s) separately from DCI for retransmission of non-punctured CB(s).

If this CB-level retransmission is applied, the methods suggested in the section B may be applied to resource mapping of the CBs which are retransmitted. At this time, the parity CBs transmitted during retransmission mentioned in the section B may be changed to the CBs which are retransmitted, whereby this section may be applied to the parity CBs. For example, if two CBs (e.g., CB 0 and CB 1) are retransmitted, each CB may be transmitted by being repeated several times as illustrated in FIG. 14. Hereinafter, for convenience of description, although description will be given based on transmission of PDSCH, the present invention may be applied to transmission of PUSCH.

If CBs having an error are retransmitted, a redundancy version (RV) value of the retransmitted CBs may be as follows.

Method 1. A specific RV value may commonly be applied to the retransmitted CBs every retransmission, that is, every PDSCH transmission of one time. The same RV value is used even in the case that one CB is transmitted by being repeated several times within one PDSCH. That is, if RV index r is used during retransmission, as illustrated in FIG. 15(a), RV r may equally be applied to all the retransmitted CBs.

Method 1-1. In the method 1, RV value applied to the retransmitted CB(s) may be indicated by the eNB through DCI.

Method 1-2. In the method 1, RV value applied to the retransmitted CB(s) may be equal to RV value used for initial or previous transmission. If the RV value used for initial transmission is applied to the retransmitted CB(s), it may mean that CB values previously transmitted/received are flushed from a buffer of the transmitting/receiving device and the systematic CBs are provided to the receiving device as new values.

Method 1-3. In the method 1, RV value applied to the retransmitted CB(s) may be determined by a specific order (e.g., 0, 2, 3, 1).

In the method 1, for example, a different value may be applied to retransmission of punctured CBs and retransmission of non-punctured CBs. Separate DCI for CBs to which different RV values are applied may be provided to the UE. A specific RV value, for example, RV value used for initial transmission may be used for retransmission of the punctured CBs. If the UE receives CB having a specific RV value from the retransmitted CBs, the UE may determine that the corresponding CB has been punctured during initial transmission or previous transmission.

Method 2. If several CBs are retransmitted, a different RV value may be applied to each CB. For example, a different value may be applied to retransmission of punctured CBs and retransmission of non-punctured CBs. If one CB is transmitted by being repeated several times within one PDSCH, a different RV value may be applied to each CB.

Method 2-1. In the method 2, if the same CB is transmitted several times during retransmission, RV value applied to the repetitions of the same CB in a specific order (e.g., 0, 2, 3, 1). For example, it is assumed that RV values are applied in the order of RV_0, RV_1, RV_2, and RV_3. In this case, among the repetitions of the same CB which is retransmitted, if the RV value applied to the first CB is RV_n, RV value applied to the second CB may be RV_n+1. For example, as illustrated in FIG. 15(*b*), if CB 0 and CB 1 are retransmitted and each CB is transmitted by being repeated several times (repetitions of 5 times in FIG. 15(*b*)), RV value applied to each repetition may be determined in a specific order. In FIG. 15(*b*), the RV value is applied by being changed in the order of 0,2,3,1 for each CB whenever the corresponding CB is repeated. RV index applied to the first transmission of each CB may 1) always be fixed to 0, 2) be RV index (or RV index applied to the last transmission if the same CB is transmitted by being repeated several times during previous PDSCH transmission) applied to the same CB during previous PDSCH transmission or initial PDSCH transmission, 3) be 'next' RV index of RV index (or RV index applied to the last transmission if the same CB is transmitted by being repeated several times during previous PDSCH transmission) applied to the same CB during previous PDSCH transmission or initial PDSCH transmission, or 4) be RV index indicated by the eNB through DCI. If RV index applied to the first transmission of each CB is indicated by the eNB through DCI, only one RV index may be indicated through DCI such that the RV index may equally be applied to the plurality of CBs transmitted during retransmission as a start RV value, or the RV index applied to each of the retransmitted CBs may be indicated through DCI such that RV index applied to the first transmission may differently be applied to each CB.

Method 2-2. In the method 2, if the same CB is transmitted several times during retransmission, the same RV index may be applied to repetitions of the same CB. A different RV index may be applied to each of different CBs. At this time, RV index applied to each CB may be indicated by the eNB through DCI every CB. The eNB may transmit different RV values through separate DCI. For example, the eNB may apply different RV values to retransmission of punctured CBs and retransmission of non-punctured CBs. A specific RV value, for example, RV value used for initial transmission may be used for retransmission of punctured CBs. If the UE receives CB having a specific RV value from the retransmitted CBs, the UE may determine that the corresponding CB has been punctured during initial transmission or previous transmission. Separate DCI for CBs to which different RV values are applied may be provided to the UE(s).

The eNB may indicate whether to apply which one of the methods of the method 1 and the methods of the method 2 to the retransmitted CBs, through RRC or DCI.

When CB-level retransmission is applied, if the receiving device may identify punctured CBs before receiving the corresponding CB, the receiving device may not perform soft-combining of the corresponding CB at the time when puncturing is applied and the corresponding CB received at another transmission time. For example, it is assumed that the transmitting device transmits CB1, CB2 and CB3 at initial transmission, retransmits CB1, CB2 and CB3 at the first retransmission and transmits CB1, CB2 and CB3 at the second retransmission. If CB2 is punctured for high interference or transmission of other data during the second retransmission, the eNB may notify the UE that CB2 is punctured during the second retransmission through DCI/PDCCH for scheduling the second retransmission. The receiving device may perform inter-CB soft-combining except a signal received at a position of CB2 during the second retransmission when performing soft-combining CBs received during initial transmission, the first retransmission and second retransmission. Meanwhile, if the receiving device identifies that a random CB has been punctured after performing soft-combining, for example, if the receiving device is indicated that CB2 of the second retransmission has been punctured through DCI/PDCCH for scheduling third retransmission after the second retransmission, the receiving device flushes all of the soft-combined CB2 from the soft-buffer. This is because that it is difficult to separate CB2 received by another (re-)transmission from the punctured CB2 after soft-combining and thus CB2 of second retransmission is damaged by puncturing or serious interference to fail to be helpful for demodulation/decoding of data to which the CB2 belongs. According to the legacy LTE/LTE-A system, since initial transmission or retransmission is scheduled in a unit of TB and transmission is performed in a unit of TB, the whole TB should be transmitted even if some CBs of the TB are damaged. On the other hand, according to the present invention, since some of CBs constituting a TB may be transmitted, it is advantageous that retransmission overhead may be reduced.

Figure 16:
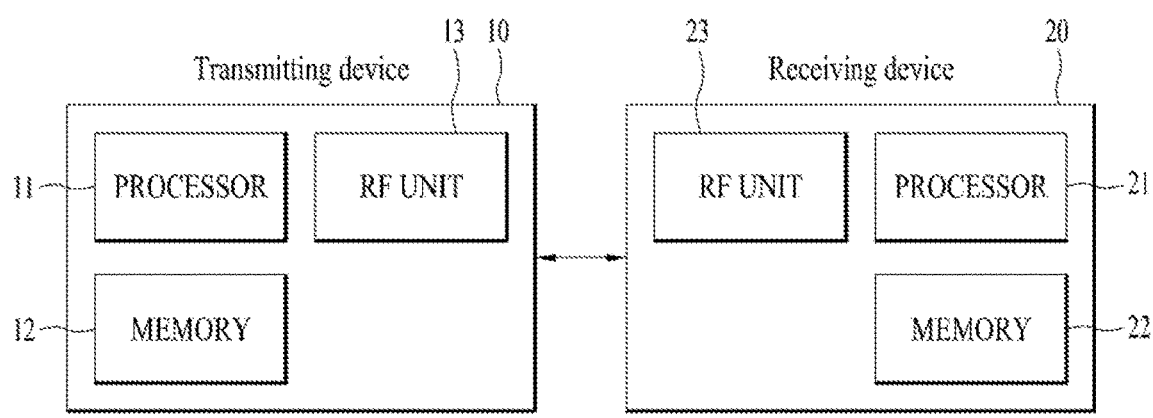
FIG. 16 is a block diagram illustrating elements of a transmitting device 10 and a receiving device 20 for implementing the present invention.

FIG. 16 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The processor 11 of the transmitting device 100 may generate code blocks (CBs) from a transport block of data and control the RF unit to transmit or retransmit the CBs to the receiving device 20 in accordance with the present invention. If the data are not received in the receiving device 20 properly, for example, if the processor 21 of the receiving device 20 fails to decode data from the received code blocks, the processor 11 may control RF unit 13 of the transmitting device 10 to perform retransmission of the data.

The eNB processor may control the eNB RF unit to transmit or retransmit CBs of downlink data. The eNB processor may control the eNB RF unit to transmit DCI for scheduling initial transmission or retransmission of downlink data in accordance with the present invention. Retransmission DCI for scheduling retransmission may include information indicating whether CBs of previous transmission include punctured CBs. The retransmission DCI may include information indicating punctured or non-punctured CBs among CBs of previous transmission. The eNB processor may include information indicating RV value of punctured or non-punctured CBs in the retransmission DCI. The UE processor may control the UE RF unit to receive transmission or retransmission of CBs corresponding to downlink data in accordance with the present invention. The eNB processor may apply a RV value to a CB in accordance with the present invention. The UE processor may control the UE RF unit to receive DCI for scheduling initial transmission or retransmission of downlink data in accordance with the present invention. Retransmission DCI for scheduling retransmission may include information indicating whether CBs of previous transmission include punctured CBs. The retransmission DCI may include information indicating punctured or non-punctured CBs among CBs of previous transmission. The UE processor may control the UE RF unit to receive DCI which includes information indicating RV value of punctured or non-punctured CBs. The UE processor may flush downlink data including punctured CBs or the punctured CBs from a buffer in accordance with the present invention. The UE processor may acquire the downlink data by combining CBs corresponding to initial transmission of the downlink data with CBs corresponding to retransmission of the downlink data and decoding the combined CBs. At this time, the UE processor may flush CBs indicated to be punctured during previous transmission, and therefore may not combine the corresponding CBs with CBs received during this transmission. The UE processor may receive or decode CBs based on the RV value applied to each CB in accordance with the present invention.

The UE processor may control the UE RF unit to transmit or retransmit CBs of uplink data in accordance with the present invention. The eNB processor may control the eNB RF unit to transmit DCI for scheduling initial transmission or retransmission of uplink data in accordance with the present invention. Retransmission DCI for scheduling retransmission may include information indicating whether CBs of previous transmission include punctured CBs. The retransmission DCI may include information indicating punctured or non-punctured CBs among CBs of previous transmission. The eNB processor may include information indicating RV value of punctured or non-punctured CBs in the retransmission DCI. The UE processor may control the UE RF unit to perform transmission or retransmission of CBs corresponding to uplink data in accordance with the present invention. The UE processor may apply RV value to CB in accordance with the present invention. The UE processor may control the UE RF unit to receive DCI for scheduling initial transmission or retransmission of uplink data in accordance with the present invention. Retransmission DCI for scheduling retransmission may include information indicating whether CBs of previous transmission include punctured CBs. The retransmission DCI may include information indicating punctured or non-punctured CBs among CBs of previous transmission. The UE processor may control the UE RF unit to receive DCI which includes information indicating RV value of punctured or non-punctured CBs. The eNB processor may flush uplink data including punctured CBs or the punctured CBs from a buffer in accordance with the present invention. The eNB processor may acquire the uplink data by combining CBs corresponding to initial transmission of the uplink data with CBs corresponding to retransmission of the uplink data and decoding the combined CBs. At this time, the eNB processor may flush CBs indicated to be punctured during previous transmission, and therefore may not combine the corresponding CBs with CBs received during this transmission. The eNB processor may receive or decode CBs based on the RV value applied to each CB in accordance with the present invention.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

The invention claimed is:

1. A method for receiving data by a receiving device, the method comprising:
   receiving a plurality of code blocks corresponding to the data;
   receiving puncturing information indicating whether the plurality of code blocks include punctured code blocks; and
   receiving retransmission of the plurality of code blocks,
   wherein retransmission of the punctured code blocks of the plurality of code blocks is received based on a first redundancy version value, and
   wherein retransmission of non-punctured code blocks is received using a second redundancy version value.

2. The method according to claim 1, wherein the puncturing information includes information indicating which code blocks of the plurality of code blocks have been punctured.

3. The method according to claim 1, wherein the first redundancy version value is equal to a redundancy version value used for initial transmission of the data.

4. The method according to claim 1, further comprising receiving first control information indicating retransmission of the punctured code blocks and second control information indicating retransmission of the non-punctured code blocks, wherein the first control information includes information on the first redundancy version value and the second control information includes information on the second redundancy version value.

5. A receiving device configured to receive data, the receiving device comprising:
   a radio frequency (RF) unit; and
   a processor configured to control the RF unit,
   wherein the processor is configured to control the RF unit to receive a plurality of code blocks corresponding to the data and receive puncturing information indicating whether the plurality of code blocks include punctured code blocks,
   wherein the processor controls the RF unit to further receive retransmission of the plurality of code blocks,
   wherein the processor receives retransmission of the punctured code blocks of the plurality of code blocks by using a first redundancy version value, and
   wherein the processor receives retransmission of non-punctured code blocks by using a second redundancy version value.

6. The receiving device according to claim 5, wherein the processor controls the RF unit to receive first control information indicating retransmission of the punctured code blocks and second control information indicating retransmission of the non-punctured code blocks, and
   wherein the first control information includes information on the first redundancy version value and the second control information includes information on the second redundancy version value.

7. The receiving device according to claim 5, wherein the puncturing information includes information indicating which code blocks of the plurality of code blocks have been punctured.

8. The receiving device according to claim 5, wherein the first redundancy version value is equal to a redundancy version value used for initial transmission of the data.

9. A method for transmitting data by a transmitting device, the method comprising:
   transmitting a plurality of code blocks obtained from the data;
   receiving puncturing information indicating whether the plurality of code blocks include punctured code blocks; and
   performing retransmission of the plurality of code blocks,
   wherein the retransmission of the punctured code blocks of the plurality of code blocks is based on a first redundancy version value, and
   wherein retransmission of non-punctured code blocks is based on a second redundancy version value.

10. The method according to claim 9, further comprising transmitting first control information indicating retransmission of the punctured code blocks and second control information indicating retransmission of the non-punctured code blocks,
    wherein the first control information includes information on the first redundancy version value and the second control information includes information on the second redundancy version value.

11. The method according to claim 9, wherein the first redundancy version value is equal to a redundancy version value used for initial transmission of the data.

12. The method according to claim 9,
    wherein the puncturing information includes information indicating which code blocks of the plurality of code blocks have been punctured.

13. A transmitting device configured to transmit data, the transmitting device comprising:
a radio frequency (RF) unit; and
a processor configured to control the RF unit,
wherein the processor is configured to control the RF unit to transmit a plurality of code blocks obtained from the data and transmit puncturing information indicating whether the plurality of code blocks include punctured code blocks,
wherein the processor is configured to control the RF unit to perform retransmission of the plurality of code blocks,
wherein the retransmission of the punctured code blocks of the plurality of code blocks is based on a first redundancy version value, and
wherein retransmission of non-punctured code blocks is based on second redundancy version value.

14. The transmitting device according to claim 13, wherein the puncturing information includes information indicating which code blocks of the plurality of code blocks have been punctured.

15. The transmitting device according to claim 13, wherein the processor is configured to control the RF unit to transmit first control information indicating retransmission of the punctured code blocks and second control information indicating retransmission of the non-punctured code blocks, and
wherein the first control information includes information on the first redundancy version value and the second control information includes information on the second redundancy version value.

16. The transmitting device according to claim 13, wherein the first redundancy version value is equal to a redundancy version value used for initial transmission of the data.

* * * * *